(12) United States Patent
Weiss et al.

(10) Patent No.: US 6,335,080 B1
(45) Date of Patent: Jan. 1, 2002

(54) MAGNETIC DISK MEDIA AND DISK DRIVES UTILIZING POLYMERIC DISK SUBSTRATES

(75) Inventors: Joel Weiss, Fremont, CA (US); Koji Shima, Osaka-Fu (JP); Zine-Eddine Boutaghou, Vadnais Heights, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/473,941

(22) Filed: Dec. 29, 1999

Related U.S. Application Data

(60) Provisional application No. 60/114,798, filed on Jan. 4, 1999.

(51) Int. Cl.$^7$ .................................................. G11B 5/66
(52) U.S. Cl. ................ 428/141; 428/336; 428/694 ST; 428/694 SL; 428/694 SG; 428/900; 360/128
(58) Field of Search ..................... 428/141, 694 ST, 428/694 SL, 694 SG, 900, 376; 360/128

(56) References Cited

U.S. PATENT DOCUMENTS

| | | | | |
|---|---|---|---|---|
| 4,326,229 A | * | 4/1982 | Yanagisawa | 360/135 |
| 4,698,251 A | * | 10/1987 | Fukuda | 428/64 |
| 4,800,458 A | | 1/1989 | Okita | 360/135 |
| 5,188,866 A | | 2/1993 | Yamamoto et al. | 427/132 |
| 5,328,740 A | * | 7/1994 | Nakayama | 428/64 |
| 5,475,673 A | | 12/1995 | Adkins | 369/286 |
| 5,547,704 A | | 8/1996 | Nagashima et al. | 427/130 |
| 5,589,244 A | | 12/1996 | Takada | 428/64.3 |
| 5,626,941 A | * | 5/1997 | Ouano | 428/141 |
| 5,635,269 A | * | 6/1997 | Weir | 428/65.3 |
| 5,648,162 A | | 7/1997 | Hirokane et al. | 428/332 |
| 5,707,728 A | | 1/1998 | Brekner et al. | 428/332 |
| 5,768,076 A | * | 6/1998 | Baumgart | 360/135 |
| 5,935,674 A | | 8/1999 | Saito et al. | 428/65.3 |
| 5,972,461 A | | 10/1999 | Sandstrom | 428/64.3 |
| 6,103,339 A | * | 8/2000 | Lin | 428/141 |

* cited by examiner

*Primary Examiner*—Leszek Kiliman
(74) *Attorney, Agent, or Firm*—McDermott, Will & Emery

(57) ABSTRACT

Lower cost magnetic recording media and disk drive systems including an improved polymeric or polymeric-based disk substrate are provided by increasing the substrate thickness sufficient to provide mechanical rigidity comparable to that provided by an aluminum-based substrate of similar diameter and forming the CSS zone on the surface of the disk at the outer rather than inner diameter thereof, with a plurality of integrally formed projections extending from the disk surface for reducing heating during head takeoff and landing. The projections are coated with diamond-like carbon (DLC) and lubricant layers for reducing heating and friction during CSS operation and providing good tribological performance when utilized with a cooperating head slider having DLC contact pads.

24 Claims, 2 Drawing Sheets

MAGNETIC DISK MEDIA AND DISK DRIVES UTILIZING POLYMERIC DISK SUBSTRATES

CROSS-REFERENCE TO PROVISIONAL APPLICATION

This application claims priority from U.S. provisional patent application Ser. No. 60/114,798 filed Jan. 4, 1999, the entire disclosure of which is incorporated herein by reference.

FIELD OF THE INVENTION

The present invention relates to a polymeric or polymer-based substrate for a magnetic hard disk recording medium, a magnetic hard disk recording medium comprising the polymeric or polymer-based substrate, and a hard disk drive system including a magnetic hard disk recording medium comprising the polymeric or polymer-based substrate. The invention has particular utility in the manufacture of lower cost magnetic hard disk systems for use in computer applications.

BACKGROUND OF THE INVENTION

Magnetic media are widely used in various applications, particularly in the computer industry. A conventional longitudinal recording disk medium 1 used in computer-related applications is schematically depicted in FIG. 1 and comprises a non-magnetic metal substrate 10, typically of an aluminum (Al) alloy, such as an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon, e.g., diamond-like carbon (DLC) formed, as is known, by sputtering of a carbon target in an appropriate atmosphere or by ion beam deposition (IBD) utilizing appropriate precursor gases, and a lubricant topcoat layer 15, typically of a perfluoropolyether compound applied, as is known, by dipping, etc. The Co-based alloy magnetic layer 13 deposited by conventional techniques, e.g., sputtering, comprises polycrystallites epitaxially grown on the polycrystalline Cr or Cr-based alloy underlayer 12.

In operation of medium 1, the magnetic layer 13 can be locally magnetized by a write transducer or write head, to record and store information. The write transducer creates a highly concentrated magnetic field which alternates direction based on the bits of information being stored. When the local magnetic field produced by the write transducer is greater than the coercivity of the recording medium layer 13, then the grains of the polycrystalline medium at that location are magnetized. The grains retain their magnetization after the magnetic field produced by the write transducer is removed. The direction of the magnetization matches the direction of the applied magnetic field. The magnetization of the recording medium can subsequently produce an electrical response in a read transducer, allowing the stored information to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop (CSS) method commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

Referring now to FIG. 2, shown therein, in perspective view, is a conventionally configured magnetic recording disk 30 having a CSS (i.e., landing) zone 36 and a data (i.e., recording) zone 40. More specifically, FIG. 2 illustrates an annularly-shaped magnetic recording disk 30 including an inner diameter 32 and an outer diameter 34. Adjacent to the inner diameter is an annularly-shaped, inner diameter CSS zone 36. When the disk 30 is operated in conjunction with a magnetic transducer head (not shown), the CSS zone 36 is the region where the head makes contact with the disk during start-stop cycles or other intermittent occurrences. In FIG. 2, the edge of the CSS zone is indicated by line 38, which is the boundary between the head landing zone 36 and the data zone 40 where information in magnetic form is stored within the magnetic recording layer of the disk.

It is considered desirable during reading and recording operations to maintain each transducer head as close to its associated recording surface as possible, i.e., to minimize the "flying height" of the head. Thus, a smooth recording surface is preferred, as well as a smooth opposing surface of the associated transducer head, thereby permitting the head and the disk to be positioned in close proximity, with an attendant increase in predictability and consistent behavior of the air bearing supporting the head during motion. However, if the head surface and the recording surface are too flat, the precision match of these surfaces gives rise to excessive stiction and friction during the start-up and stopping phases of the cyclic sequence, thereby causing wear to the head and recording surfaces, eventually leading to what is referred to as "head crash". Thus, there are competing goals of reducing head/disk friction and minimizing transducer flying height.

Conventional practices for addressing these apparent competing objectives involve providing a magnetic disk recording medium with a toughened recording surface to reduce head/disk friction by techniques generally known as "texturing". Conventional texturing techniques involve circumferential polishing or localized laser heating to create a "bump" pattern with precisely defined features on the surface of a disk substrate, e.g., of Al—Mg alloy, to provide a texture thereon prior to subsequent deposition thereon of layers, such as an underlayer, a magnetic layer, a protective overcoat, and a lubricant topcoat, wherein the textured surface of the underlying substrate is intended to be substantially replicated in the subsequently deposited layers.

The continuing trend toward the manufacture of very low cost (e.g., <$500) personal computers (PCs) necessitates a reduction in the cost of hard disk drives utilized in such computers. Accordingly, the use of lower cost materials, e.g., polymers, glass, ceramics, and glass-ceramics as replacements for the conventional Al-alloy based substrates for magnetic disk media has been proposed. However, only glass and glass-ceramic composite materials have been successfully utilized for the manufacture of practical disk drives. The extreme difficulty associated with grinding and lapping of glass and glass-ceramic composite materials have limited their use to only higher cost applications such as mobile disk drives for "notebook"-type computers. Poor mechanical and tribological performance, track misregistration (TMR) and poor flyability have been particularly problematic in the case of polymer-based substrates fabricated as to essentially copy or mimic conventional hard disk design features and criteria.

Accordingly, there exists a need for improved polymeric or polymer-based substrates suitable for use in the manufacture of hard disk magnetic recording media. In addition, there exists a need for improved hard disk drive systems including polymer substrate-based magnetic recording media utilized in conjunction with improved flying heads for providing optimum tribological performance comparable to, and at significantly lower cost than conventional Al alloy substrate-based hard disk drive systems.

The present invention addresses and solves the problems attendant upon the design, manufacture, and use of high recording density, hard disk magnetic media and systems incorporating same, while maintaining full compatibility with all mechanical aspects of conventional drive technology. Moreover, the present invention enables the manufacture of such hard disk magnetic media and disk drive systems at significantly reduced cost vis-à-vis conventional and manufacturing processes, thereby contributing substantially toward achieving the aim of manufacturing very low cost computers.

DISCLOSURE OF THE INVENTION

An advantage of the present invention is an improved substrate for a magnetic hard disk data recording/retrieval medium.

Another advantage of the present invention is an improved polymeric or polymer-based substrate for a magnetic hard disk recording medium.

Yet another advantage of the present invention is an improved magnetic hard disk data recording/retrieval medium.

Still another advantage of the present invention is an improved polymeric or polymer substrate-based magnetic hard disk recording medium.

A further advantage of the present invention is an improved magnetic hard disk drive data recording/retrieval system.

A still further advantage of the present system is an improved polymeric or polymer substrate-based magnetic hard disk drive system.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to one aspect of the present invention, the foregoing and other advantages are obtained in part by a substrate for a magnetic hard disk data recording/retrieval medium, comprising:

an annularly-shaped disk comprised of a polymeric or polymer-based material having inner and outer diameters and a pair of opposed major surfaces; and a first, annularly-shaped region adjacent the outer diameter of at least one of the pair of surfaces and comprising a plurality of spaced-apart projections integrally formed therewith and extending therefrom, the first region forming a CSS or landing zone adjacent the outer diameter.

According to embodiments of the present invention, the disk has an outer diameter of from about 1.0 to about 4.0 inches and a rigidity or stifffiess at least equal to that of an about 20 to about 50 mils. thick aluminum (Al)-based disk of same outer diameter.

According to further embodiments of the present invention, the disk has a thickness of from about 60 to about 180 mils. and comprises at least one polymer selected from the group consisting of: polycarbonates, polyacrylates, polyesters, epoxy resins, polysulfones, polyether sulfones, polyimides, polyetherimides, and polystyrenes; the first, annularly-shaped CSS region or landing zone adjacent the outer diameter of the disk has a width of from about 50 to 150 mils.; each of the plurality of projections is integrally formed with the at least one disk surface by molding and forms a column from about 3 to about 10 $\mu$m wide with a rounded upper surface, and extends for from about 50 to about 150 Å above the disk surface, with spacings of from about 8 to about 30 $\mu$m between adjacent projections.

According to still further embodiments of the present invention, the substrate further comprises; a second, annularly-shaped region adjacent the inner diameter of the disk and comprising a plurality of depressions formed within one of the pair of disk surfaces, for use in clamping of the disk at the inner diameter thereof; and a third, annularly-shaped region intermediate the first and second annularly-shaped regions for forming a data/recording zone, the surface of the third, annularly-shaped region being textured.

According to another aspect of the present invention, a magnetic hard disk medium comprises:

an annularly-shaped disk comprised of a polymeric or polymer-based material having inner and outer diameters and a pair of opposed major surfaces;

a first, annularly-shaped region adjacent the outer diameter of at least one of the pair of surfaces and comprising a plurality of spaced-apart projections integrally formed therewith and extending therefrom, the first region forming a CSS region or landing zone adjacent the outer diameter;

a second, annularly-shaped region inwardly adjacent to the first, annularly-shaped region and forming a data/recording zone;

a stack of layers formed over at least the surface of the second, annularlyshaped region and comprising, in sequence from the surface thereof:

an underlayer;

a magnetic film;

a protective overcoat; and a lubricant topcoat.

According to embodiments of the present invention, the layer stack extends over the surface of the first, annularly-shaped region, each layer of the layer stack replicates the surface contour of each of the plurality of projections; the medium further comprises a third, annularly-shaped region adjacent the inner diameter of the disk and comprises a plurality of recesses formed within one of the disk surfaces, for use in clamping of the disk at its inner diameter; and the surface of the second, annularly-shaped region forming the data/recording zone is textured and each layer of the layer stack replicates the surface contour provided by the texture.

According to yet another aspect of the present invention, a magnetic hard disk drive system comprises:

an annularly-shaped disk comprised of a polymeric or polymer-based material having inner and outer diameters and a pair of opposed major surfaces;

a first, annularly-shaped region adjacent the outer diameter of at least one of the pair of surfaces and comprising a plurality of spaced-apart projections integrally formed therewith and extending therefrom, the first, annularly-shaped region forming a CSS or landing zone for a head slider adjacent the inner diameter;

a second, annularly-shaped region inwardly adjacent to the first, annularly-shaped region and forming a data/recording zone;

a stack of layers formed over at least the surface of the second, annularly-shaped region and comprising, in sequence from the surface thereof:

an underlayer;

a magnetic film;

a protective overcoat;

a lubricant topcoat; and a head slider positioned in proximity to the surface of the lubricant topcoat and including at least one slider pad comprised of a diamond like carbon (DLC) material facing the surface of the lubricant topcoat.

According to still another aspect of the present invention, a magnetic hard disk system comprises:

a magnetic hard disk recording medium comprising a substantially rigid polymeric or polymer-based substrate; and head slider means in proximity to a surface of said medium for effecting storing and reading/out data/information stored in the magnetic medium.

Additional advantages of the present invention will become readily apparent to those skilled in the art from the following detailed description, wherein embodiments of the invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not as limitative.

BRIEF DESCRIPTION OF THE DRAWINGS

The following detailed description of the embodiment of the present invention can best be understood when read in conjunction with the following drawings, wherein.

DESCRIPTION OF THE INVENTION

The present invention addresses and solves problems arising from the inability to provide practically usable polymeric or polymer-based substrates for use in magnetic recording media, such as hard disks and hard disk drives required for the manufacture of very low cost computers and other devices requiring such type data/information storage and retrieval capability. More specifically, the inventive methodology avoids the problems of inadequate rigidity or stiffness and poor tribological properties associated with polymeric and polymeric-based materials utilized as disk substrates.

According to the present invention, the above-enumerated problems and difficulties attendant upon the use of polymeric or polymer-based substrates for the manufacture of magnetic recording media and systems, such as hard disks and disk drive systems, are substantially eliminated by the inventive methodology which includes a number of novel features including, inter alia:

(1) use of polymeric or polymer-based disk substrates of thickness selected to provide rigidity or stiffness at least equal to that provided by an Al alloy-based substrate of same diameter and of conventional thickness for that diameter;

(2) placement of the CSS or landing zone at the outer rather than inner diameter of the annularly-shaped, polymeric or polymer-based disk substrate;

(3) provision of a plurality of bumps or projections extending from the surface of the CSS zone and integrally formed therewith, as by molding;

(4) formation of a diamond-like carbon (DLC) protective overcoat and lubricant topcoat layer system over the projections, wherein each of the layers replicates the surface contour of each of the projections;

(5) provision of grooves or recesses in the disk surface at the inner disk diameter for providing elastic deformation disk clamping which avoids disk slippage during shock events; and (6) provision of pad-assisted slider heads including DLC-based pads for improving tribological performance by reducing frictional heating and friction during head takeoff and landing.

Figure 3:
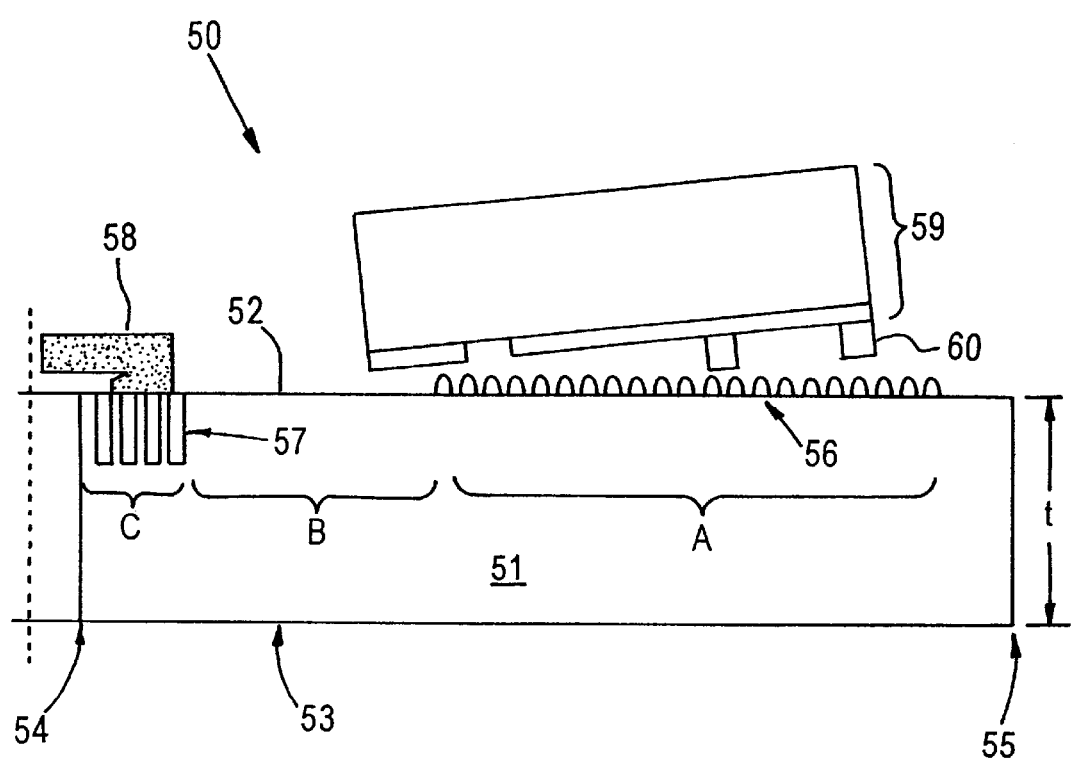
FIG. 3 schematically illustrates, in partial cross-sectional view, a disk drive system including a polymeric or polymeric-based disk substrate and padassisted head slider structured according to the inventive methodology.

Referring now to FIG. 3, shown therein in simplified, partial cross-sectional form, is an illustrative, but not limitative, embodiment of a hard disk drive system 50 fabricated according to the methodology and principles of the present invention. As will be apparent to one of ordinary skill in the art, the inventive methodology and principles are readily and equally adapted for use in the manufacture of a variety of recording media, e.g., magneto-optical (MO) disk media. It should also be understood that the drawing figure representing portions of a disk-shaped substrate is not drawn to scale, but instead is drawn as to best illustrate the features of the present invention.

Referring now more particularly to FIG. 3, a polymeric or polymer-based disk-shaped substrate 51 suitable for use in the manufacture of longitudinal recording disk media according to the present invention, comprises an annularly-shaped disk having opposed upper 52 and lower 53 major surfaces and inner 54 and outer 55 diameters. According to the invention, substrate 51 may be entirely composed of at least one polymer material (i.e., "polymeric") or may include at least one filler material (i.e., "polymer-based"), such as glass, ceramic, etc. According to the invention, the polymeric or polymeric-based substrate 51 of given outer diameter 55 is required to have a thickness t sufficient to provide a mechanical rigidity or stiffness at least equal to an aluminum (Al) or Al alloy-based substrate of same outer diameter 55 and conventional thickness for that outer diameter. Suitable polymers for use in the present invention include, but are not limited to: polycarbonates, polyacrylates, polyesters, epoxy resins, polysulfones, polyether sulfones, polyimides, polyetherimides, polystyrenes, and combinations thereof.

The required thickness t of the polymeric or polymer-based substrate 51 may be determined from the following relationship:

$$E_p t_p^3 > E_{Al} t_{Al}^3,$$

wherein:

$E_p$ and $E_{Al}$, respectively, are the Young's modulus values for the polymer material and aluminum or its alloy (e.g., $E_p = 0.5 - 1.5 \times 10^6$ psi and $E_{Al} = 10 \times 10^6$ psi);

and $t_p$ and $t_{Al}$, respectively, are the thickness values in mils. of the polymer and aluminum-based substrates. For example, according to the above relation and values of $E_p$ and $A_{Al}$, a polymeric or polymer-based disk having a thickness of about 100 mils. will be mechanically superior to an Al-based disk about 30 mils. thick. Polymeric or polymeric-based substrates contemplated for use in the present invention may typically have an outer diameter of from about 1.0 to about 4.0 inches and a mechanical rigidity or stiffness at least equal to that of an about 20 to about 50 mil. thick Al or Al alloy-based disk of same outer diameter. Corresponding typical thicknesses of the polymeric or polymer-based substrate are from about 60 to about 180 mils. Any added inertial effects arising from the increased substrate thickness vis-à-vis Al or Al alloy-based substrates, hence increased weight, can be overcome, or at least compensated for, by proper selection of the drive motor and design of the disk clamp, described in more detail below.

With continued reference to FIG. 3, the upper major surface 52 of annularly-shaped disk substrate 51 comprises, in order from the disk outer diameter 55, an annularly-shaped CSS or landing zone A adjacent the disk outer diameter, an annularly-shaped data/recording zone B inwardly adjacent to the CSS zone A, and an annularly-shaped disk clamping zone C adjacent the disk inner diameter 54. It should be noted that the widths of each of zones A, B, and C as illustrated in FIG. 2 are not drawn to scale and thus do not indicate relative widths of each zone.

Figure 2:
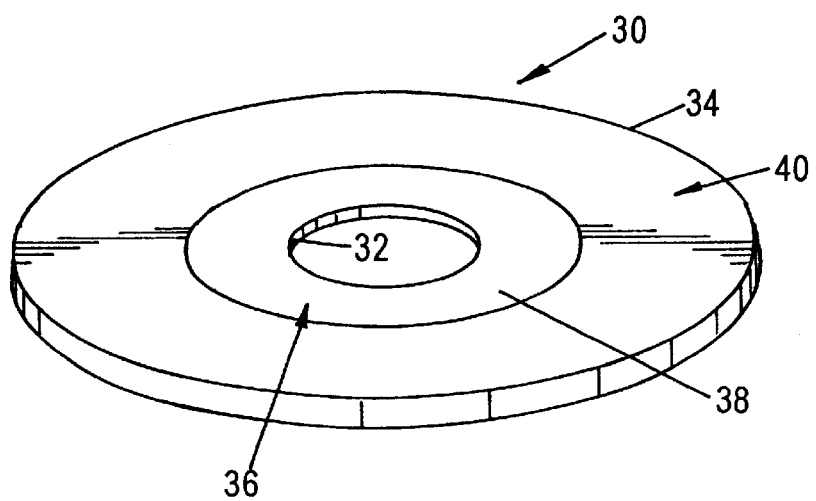
FIG. 2 is a perspective view of a magnetic disk as in FIG. 1 for illustrating the CSS (landing) and data zones thereof.

Placement of the CSS or landing zone A adjacent to the outer disk diameter 55 according to the present invention constitutes a departure from the conventional practice with e.g., Al or Al alloy based substrates, of locating the CSS zone adjacent the inner diameter, as shown in FIG. 2 illustrating the prior art. According to the present invention, CSS zone A typically has a width of from about 50 to about 150 mils. and includes a plurality of spaced apart projections 56 integrally formed (as by conventional molding techniques not described herein for brevity) with upper major surface 52 and extending therefrom. Each of the projections 56 comprises an upwardly extending column typically having a width of from about 3 to about 10 μm and a generally rounded upper edge or surface, and typically extends for from about 50 to about 150 Å above upper surface 52, with spacings typically from about 8 to about 30 μm between adjacent portions.

Figure 1:
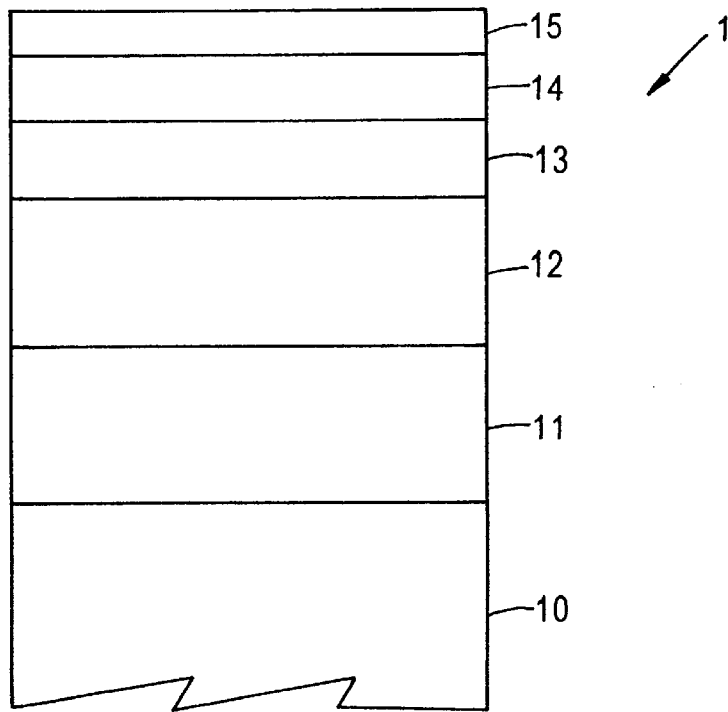
FIG. 1 schematically illustrates, in cross-sectional view, a conventional magnetic recording medium comprising an Al-based substrate.

Data/recording zone B is formed on the portion of the upper major surface 52 inwardly adjacent to the CSS or landing zone and typically has a width of from about 0.5 to about 1.5 in. A magnetic recording medium comprising a layer stack, or laminate, similar to that illustrated in FIG. 1 and including at least layers 11–15, is formed thereat, as by conventional electroless plating and sputtering techniques not described herein in order not to obscure the present invention. Typically, the laminate of layers 11–15 is formed to extend over the surface of the CSS or landing zone A comprising projections 56, in which case each component layer of the layer stack substantially replicates the surface contour of each of the projections. Similarly, in the event the upper major surface 52 of the disk in the data/recording zone B has been textured for improving its tribological performance, as is known, each component layer of the layer stack substantially replicates the surface contour provided by the texture.

Disk clamping zone C formed adjacent the disk inner diameter 54 comprises a plurality of grooves or recesses 57 formed (as by molding or a suitable material removal technique) in one of the major disk surfaces, illustratively upper major surface 52 and provides a degree of elastic deformation of the disk when clamping force is applied to the spindle area adjacent the disk inner diameter 54 by clamp 58. According to the invention, the number, spacing, and dimensions of the depressions are not critical but should provide sufficient elastic deformation of the substrate 51 for providing locking of the disk by clamp 58 adequate to prevent slippage during shock-type events.

Referring still to FIG. 3, yet another feature of the present invention is provision of an improved head slider 59 including a plurality of diamond-like carbon (DLC)-coated slider pads 60 at its lower surface facing the disk upper surface 52. As illustrated, the DLC-coated slider pads 60 are adapted to contact one or more of the DLC/lubricant coated projections 56 of the CSS or landing zone A. The combination of DLC-coated slider pads 60/CSS zone projections 56 reduces stiction/friction during CSS operation and frictional heating and friction during head slider takeoff and landing phases during operation of the disk drive and, as a consequence, significantly improved tribological performance is provided, vis-à-vis that obtained with prior polymer-based disk substrates.

Another embodiment of the present invention comprises a dual-sided disk-shaped magnetic medium and hard disk drive corresponding to the single-sided embodiment shown in FIG. 3 and described above, where, however, the disk lower major surface 53 is structured identically to the disk upper major surface 53 and a head slider provided with DLC-coated slider pads 60 is provided for recording and reading out stored data/information.

Conventional techniques, such as injection molding may be employed for fabricating the polymeric or polymer-based substrates according to the present invention. Each of the various layers comprising the layer stack or laminate constituting the magnetic recording medium can also be formed by techniques and methodologies conventionally employed in the manufacture of magnetic media, including, inter alia, electroless plating, cathode sputtering, ion beam deposition, and lubricant coating, as by dipping.

Thus, the present invention advantageously provides, as by conventional processing techniques and methodologies, low cost, high quality, tribologically robust, polymeric or polymeric-based disk substrates suitable for use in low cost magnetic and/or magneto-optical data/information retrieval media, as well as disk drive systems including improved head slider means for cooperation therewith.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concepts as expressed herein.

What is claimed is:

1. A substrate for a magnetic hard disk data recording/retrieval medium, comprising:

an annularly-shaped disk comprised of a polymeric or polymer-based material having inner and outer diameters and a pair of opposed major surfaces; and a first, annularly-shaped region adjacent said outer diameter of at least one of said pair of surfaces and comprising a plurality of spaced-apart projections integrally formed therewith and extending therefrom, said first region forming a CSS or landing zone adjacent said outer diameter.

2. The substrate as in claim 1, wherein:

said polymeric or polymeric-based disk has an outer diameter of from about 1.0 to about 4.0 inches and a rigidity or stiffness at least equal to that of an about 20 to about 50 mils. thick aluminum (Al)-based disk of same outer diameter.

3. The substrate as in claim 2, wherein:

said polymeric or polymer-based disk has a thickness of from about 60 to about 180 mils.

4. The substrate as in claim 1, wherein:

said disk comprises at least one polymer selected from the group consisting of:
   polycarbonates, polyacrylates, polyesters, epoxy resins, polysulfones, polyether sulfones, polyimides, polyetherimides, and polystyrenes.

5. The substrate as in claim 1, wherein:

said first, annularly-shaped CSS region or landing zone adjacent said outer diameter of said disk has a width of from about 50 to about 150 mils.

6. The substrate as in claim 5, wherein:

each of said plurality of projections is integrally formed with said at least one disk surface by molding and forms a column from about 3 to about 10 $\mu$m wide with a rounded upper surface, and extends for from about 50 to about 150 Å above said disk surface, with spacings of from about 8 to about 30 $\mu$m between adjacent projections.

7. The substrate as in claim 1, further comprising: a second, annularly-shaped region adjacent said inner diameter of said disk and comprising a plurality of recesses formed within one of said pair of disk surfaces, said recesses being adapted for use with a clamp for clamping of said disk at said inner diameter.

8. The substrate as in claim 7, further comprising:

a third, annularly-shaped region intermediate said first and second annularly-shaped regions, for forming a data/recording zone.

9. The substrate as in claim 8, wherein:

the surface of said third, annularly-shaped region is textured.

10. A magnetic hard disk recording medium comprising:

an annularly-shaped disk comprised of a polymeric or polymer-based material having inner and outer diameters and a pair of opposed major surfaces;

a first, annularly-shaped region adjacent said outer diameter of at least one of said pair of surfaces and comprising a plurality of spaced-apart projections integrally formed therewith and extending therefrom, said first region forming a CSS region or landing zone adjacent said outer diameter;

a second, annularly-shaped region inwardly adjacent to said first, annularly-shaped region and forming a data/recording zone;

a stack of layers formed over at least the surface of said second, annularly-shaped region and comprising, in sequence from said surface thereof:
    an underlayer;
    a magnetic film;
    a protective overcoat; and
    a lubricant topcoat.

11. The medium as in claim 10, wherein:

said polymeric or polymer-based disk has an outer diameter of from about 1.0 to about 4.0 inches and a rigidity or stiffness at least equal to that of an about 20 to about 50 mils. thick aluminum (Al)-based disk of same outer diameter.

12. The medium as in claim 11, wherein:

said polymeric or polymer-based disk has a thickness of from about 60 to about 180 mils.

13. The medium as in claim 10, wherein:

said disk comprises at least one polymer selected from the group consisting of: polycarbonates, polyacrylates, polyesters, epoxy resins, polysulfones, polyether sulfones, polyimides, polyetherimides, and polystyrenes.

14. The medium as in claim 10, wherein:

said first, annularly-shaped CSS region or landing zone adjacent said outer diameter of said disk has a width of from about 50 to about 150 mils, said layer stack extends over the surface of said first, annularly-shaped region, and each layer of said layer stack replicates the surface contour of each of said plurality of projections.

15. The medium as in claim 14, wherein:

each of said plurality of projections is integrally formed with said at least one disk surface by molding and forms a column from about 3 to about 10 $\mu$m wide with a rounded upper surface, and extends for from about 50 to about 150 Å above said disk surface, with spacings of from about 8 to about 30 $\mu$m between adjacent projections.

16. The medium as in claim 10, further comprising:

a third, annularly-shaped region adjacent said inner diameter of said disk and comprising a plurality of recesses formed within one of said pair of disk surfaces, said recesses being adapted for use with a clamp for clamping of said disk at said inner diameter.

17. The medium as in claim 10, wherein:

the surface of said second, annularly-shaped region forming said data/recording zone is textured and each layer of said layer stack replicates the surface contour provided by said texture.

18. A magnetic hard disk drive system, comprising:

an annularly-shaped disk comprised of a polymeric or polymer-based material having inner and outer diameters and a pair of opposed major surfaces;

a first, annularly-shaped region adjacent said outer diameter of at least one of said pair of surfaces and comprising a plurality of spaced-apart projections integrally formed therewith and extending therefrom, said first, annularly-shaped region forming a CSS or landing zone for a head slider adjacent said [inner] outer diameter;

a second, annularly-shaped region inwardly adjacent to said first, annularly-shaped region and forming a data/recording zone;

a stack of layers formed over at least the surface of said second, annularly-shaped region and comprising, in sequence from said surface thereof:
an underlayer;
a magnetic film;
a protective overcoat;
a lubricant topcoat; and a head slider positioned in proximity to the surface of said lubricant topcoat and including at least one slider pad comprised of a diamond-like carbon (DLC) material facing said surface of said lubricant topcoat.

19. The system according to claim 18, wherein:

said disk comprises at least one polymer selected from the group consisting of: polycarbonates, polyacrylates, polyesters, epoxy resins, polysulfones, polyether sulfones, polyimides, polyetherimides, and polystyrenes, and has an outer diameter of from about 1.0 to about 4.0 inches and a thickness of from about 60 to about 180 mils. for providing a rigidity or stiffness at least equal to that of an about 20 to about 50 mils. thick aluminum (Al)-based disk of same diameter.

20. The system according to claim 18, wherein:

said first, annularly-shaped CSS region or landing zone adjacent said outer diameter of said disk has a width of from about 50 to about 150 mils, each of said plurality of projections is integrally formed with said at least one disk surface by molding and forms a column from about 3 to about 10 $\mu$m wide with a rounded upper surface, and extends for from about 50 to about 150 Å above said disk surface, with spacings of from about 8 to about 30 $\mu$m between adjacent projections, said layer stack extends over the surface of the first, annularly-shaped region, and each layer of said layer stack replicates the surface contour of each of said plurality of projections.

21. The system according to claim 18, further comprising:

a third, annularly-shaped region adjacent said inner diameter of said disk and comprising a plurality of recesses formed within one of said pair of disk surfaces, said recesses being adapted for use with a clamp for clamping of said disk at said inner diameter.

22. The system according to claim 18, wherein:

the surface of said second, annularly-shaped region forming said data/recording zone is textured and each layer of said layer stack replicates the surface contour provided by said texture.

23. A magnetic hard disk system, comprising:

a magnetic hard disk recording medium comprising a substantially rigid polymeric or polymer-based substrate, a surface of said medium including a CSS or landing zone adjacent an outer diameter of said disk; and head slider means in proximity to said surface of said medium for effecting storing and reading out data/information stored in said magnetic hard disk medium.

24. The system according to claim 23, wherein:

said head slider means includes at least one pad comprised of a diamondlike carbon (DLC) material facing the magnetic recording medium.

\* \* \* \* \*